United States Patent
Ricci et al.

(10) Patent No.: US 8,043,170 B2
(45) Date of Patent: *Oct. 25, 2011

(54) SATURATED POLYURETHANE COMPOSITIONS AND THEIR USE IN GOLF BALLS

(75) Inventors: Shawn Ricci, New Bedford, MA (US); Christopher Cavallaro, Lakeville, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/899,619

(22) Filed: Oct. 7, 2010

(65) Prior Publication Data

US 2011/0028244 A1 Feb. 3, 2011

Related U.S. Application Data

(62) Division of application No. 11/626,010, filed on Jan. 23, 2007, now Pat. No. 7,867,108.

(51) Int. Cl.
*A63B 37/06* (2006.01)

(52) U.S. Cl. .......................................................... 473/378
(58) Field of Classification Search .................. 473/378, 473/351

See application file for complete search history.

(56) References Cited

U.S. PATENT DOCUMENTS

| | | | |
|---|---|---|---|
| 6,530,849 B2 | 3/2003 | Peter | |
| 6,699,957 B2 | 3/2004 | Gajewski et al. | |
| 6,835,794 B2 | 12/2004 | Wu et al. | |
| 7,867,108 B2 * | 1/2011 | Ricci et al. | 473/378 |
| 2004/0225068 A1 | 11/2004 | Rajagopalan et al. | |
| 2005/0038190 A1 | 2/2005 | Kuntimaddi | |

* cited by examiner

*Primary Examiner* — Raeann Gorden
(74) *Attorney, Agent, or Firm* — Margaret C. Barker

(57) ABSTRACT

The present invention is directed to golf balls having at least one layer formed from a saturated polyurethane composition. The polyurethane is the product of a reaction between an $H_{12}$MDI/PTMEG-based prepolymer and a polycaprolactone curing agent. Golf balls of the present invention include one-piece, two-piece, multi-layer, and wound golf balls. The composition may be present in any one or more of a core layer, a cover layer, or an intermediate layer.

6 Claims, No Drawings

SATURATED POLYURETHANE COMPOSITIONS AND THEIR USE IN GOLF BALLS

CROSS REFERENCE TO RELATED APPLICATIONS

This application is a division of U.S. patent application Ser. No. 11/626,010, filed Jan. 23, 2007 now U.S. Pat. No. 7,867,108.

FIELD OF THE INVENTION

The present invention is directed to saturated polyurethane compositions having a Shore D hardness of greater than 52, and to the use of such compositions in golf balls.

BACKGROUND OF THE INVENTION

Polyurethanes are known to be useful in forming golf ball layers. However, the use of polyurethanes for particular golf ball applications is limited. For example, conventional polyurethanes having a material hardness of greater than 52 Shore D exhibit a loss of shear resistance and/or impact durability. Thus, in golf ball applications wherein a composition having a material hardness of greater than 52 Shore D is desired, golf ball producers are generally limited to ionomeric materials, such as Surlyn® ionomers, due to their superior shear and impact resistance.

A desire remains in the golf ball industry for shear resistant polyurethane compositions having a material hardness of greater than 52 Shore D. The present invention describes such compositions and the use thereof in a variety of golf ball intermediate and cover layers.

SUMMARY OF THE INVENTION

In one embodiment, the present invention is directed to a golf ball having at least one layer formed from a saturated polyurethane composition, wherein the polyurethane is the product of a reaction between an $H_{12}$MDI/PTMEG-based prepolymer and a polycaprolactone curing agent.

In another embodiment, the present invention is directed to a golf ball comprising a core layer and a cover layer, wherein the cover layer is formed from a saturated polyurethane composition. The polyurethane is the product of a reaction between an $H_{12}$MDI/PTMEG-based prepolymer and a polycaprolactone curing agent.

In yet another embodiment, the present invention is directed to a golf ball comprising a core layer and a cover layer, wherein the cover layer is formed from a saturated polyurethane composition exhibiting no failures at 250 hits in an impact durability test and having a material hardness of at least 55 Shore D. The polyurethane is the product of a reaction between an $H_{12}$MDI/PTMEG-based prepolymer and a polycaprolactone curing agent.

DETAILED DESCRIPTION OF THE INVENTION

The present invention is directed to a golf ball having at least one layer formed from a composition comprising a saturated polyurethane. For purposes of the present disclosure, the term "saturated" refers to polyurethanes having saturated aliphatic and alicyclic polymer backbones, i.e., with no carbon-carbon double bonds.

Polyurethanes are the product of a reaction between at least one polyurethane prepolymer and at least one curing agent. Polyurethane prepolymers are the product formed by a reaction between at least one polyol and at least one diisocyanate. In polyurethane prepolymers of the present invention, polytetramethylene ether glycol ("PTMEG") is selected as the polyol and bis(4-isocyanatocyclohexyl) methane ("$H_{12}$MDI") is selected as the diisocyanate. The curing agent is preferably a polycaprolactone. More preferably the curing agent is selected from trimethylol propane ("TMP")-initiated polycaprolactone, diethylene glycol ("DEG")-initiated polycaprolactone, and polycarbonate-initiated polycaprolactone.

The ratio of prepolymer to curing agent for polyurethanes of the present invention is preferably from 0.5:1 to 16:1.

As is well known in the art, a catalyst may be employed to promote the reaction between the curing agent and the isocyanate and polyol. Suitable catalysts include, but are not limited to, bismuth catalyst; zinc octoate; tin catalysts, such as di-butyltin dilaurate, di-butyltin diacetate, tin(II) chloride, tin(IV) chloride, di-butyltin dimethoxide, dimethyl-bis[(1-oxonedecyl)oxy]stannane, di-n-octyltin bis-isooctyl mercaptoacetate; amine catalysts, such as triethylenediamine, triethylamine, and tributylamine; organic acids, such as POLYCAT® organic amine catalysts, commercially available from Air Products and Chemicals, Inc.; and combinations thereof. The catalyst is preferably added in an amount sufficient to catalyze the reaction of the components in the reactive mixture. In a particular embodiment, the catalyst is present in an amount of from 0.001 wt % to 5 wt %, based on the total weight of the composition.

By the present invention, it has been found that beneficial physical properties are obtained in the resulting polyurethane composition when an $H_{12}$MDI/PTMEG compound is selected as the prepolymer and a polycaprolactone is selected as the curing agent. For example, such polyurethanes can be produced having a material hardness of greater than 50 Shore D, a shear rating of 0 or 1, and exhibiting no failures at 150 hits in an impact durability test. Thus, polyurethanes of the present invention have desirable hardness values while maintaining shear and impact resistance.

In a particular embodiment, polyurethane compositions of the present invention have a material hardness of greater than 52 Shore D. In another particular embodiment, polyurethane compositions of the present invention have a material hardness of at least 55 Shore D or at least 60 Shore D. In yet another particular embodiment, polyurethane compositions of the present invention have a material hardness within a range having a lower limit of 50 or 52 or 55 or 58 or 60 Shore D and an upper limit of 65 or 67 or 70 Shore D.

In a particular embodiment, polyurethane compositions of the present invention exhibit no failures at 175 hits in an impact durability test. In another particular embodiment, no failures are exhibited at 200 hits. In another particular embodiment, no failures are exhibited at 250 hits. In another particular embodiment, no failures are exhibited at 300 hits. In another particular embodiment, no failures are exhibited at 350 hits. In yet another particular embodiment, no failures are exhibited at 375 hits.

Polyurethane compositions of the present invention may also include one or more conventional components, such as color dispersion resins, $TiO_2$, ZnO, optical brighteners, surfactants, processing aids, foaming agents, density-controlling fillers, UV stabilizers, and light stabilizers. Saturated polyurethanes are resistant to discoloration; nonetheless, the addition of UV absorbers and/or light stabilizers may help to maintain their tensile strength and elongation.

The saturated polyurethane of the present invention may be blended with other thermoplastics to form the golf ball layer composition. Preferably, the saturated polyurethane is present in the blend composition in an amount of at least 25 wt %, or at least 50 wt %, or at least 75 wt %, based on the total weight of the blend composition. Suitable thermoplastics for blending with the saturated polyurethane include, but are not limited to, polyurethane/polyurea ionomers, polyurethanes, polyureas, epoxy resins, polyethylenes, polyamides, polyesters, polycarbonates, polyacrylin, and combinations thereof.

The present invention also contemplates the acid functionalization of the polyurethane compositions as disclosed in U.S. Pat. No. 6,610,812, the entire disclosure of which is hereby incorporated herein by reference. Without wishing to be bound by any particular theory, it is believed that polyurethanes including acid functional moieties or groups have improved adhesion to other components or layers. The acid functional group is preferably based on a sulfonic group ($HSO_3$), carboxylic group ($HCO_2$), phosphoric acid group ($H_2PO_3$), or a combination thereof. More than one type of acid functional group may be incorporated into the polyurethane.

Saturated polyurethanes and methods for producing saturated polyurethane compositions are further disclosed, for example, in U.S. Pat. Nos. 6,476,176 and 6,835,794, the entire disclosures of which are hereby incorporated herein by reference.

Polyurethane compositions of the present invention can be used in a variety of applications, including, for example, golf equipment, such as golf balls, golf shoes, and golf clubs.

Golf balls of the present invention include one-piece, two-piece, multi-layer, and wound golf balls having a variety of core structures, intermediate layers, covers, and coatings. Golf balls of the present invention have at least one layer formed from a saturated polyurethane composition wherein the polyurethane is the product of a reaction between an $H_{12}$MDI/PTMEG-based prepolymer and a polycaprolactone curing agent. In golf balls having two or more layers which comprise a polyurethane composition of the present invention, the polyurethane composition of one layer may be the same or a different polyurethane composition as another layer. Polyurethane compositions of the present invention may be formed into golf ball layers using known techniques, including casting and reaction injection molding.

Golf ball covers of the present invention include single, dual, and multilayer covers, and preferably have an overall thickness within the range having a lower limit of 0.01 inches or 0.02 inches or 0.05 inches or 0.06 inches or 0.1 inches or 0.115 inches and an upper limit of 0.15 inches or 0.2 inches or 0.25 inches or 0.5 inches or 0.8 inches or 1.0 inches. Dual and multilayer covers have an inner cover layer and an outer cover layer, and multilayer covers additionally have at least one intermediate cover layer disposed between the inner cover layer and the outer cover layer. Inner cover layers of the present invention preferably have a thickness within the range having a lower limit of 0.005 inches or 0.01 inches or 0.02 inches or 0.025 inches or 0.03 inches and an upper limit of 0.05 inches or 0.1 inches or 0.15 inches or 0.2 inches. Outer cover layers of the present invention preferably have a thickness of 0.01 inches or 0.02 inches or 0.025 inches or 0.03 inches and an upper limit of 0.04 inches or 0.05 inches or 0.15 inches or 0.2 inches. Intermediate cover layer(s) of the present invention preferably have a thickness of 0.01 inches or 0.02 inches or 0.025 inches and an upper limit of 0.05 inches or 0.15 inches or 0.2 inches.

Preferably at least one cover layer is formed from a saturated polyurethane composition of the present invention. Also suitable as cover layer materials are tough, cut-resistant materials selected based on the desired performance characteristics and include, but are not limited to, polyethylene, including, for example, low density polyethylene, linear low density polyethylene, and high density polyethylene; polypropylene; rubber-toughened olefin polymers; copolyether-esters; copolyether-amides; polycarbonates; plastomers; flexomers; block copolymers, such as styrene-butadiene rubber and isoprene- or ethylene-butylene rubber; dynamically vulcanized elastomers; ethylene vinyl acetates; ethylene methacrylates; vinyl resins comprising vinyl chloride; acrylic resins; polyamides, amide-ester elastomers, and graft copolymers of ionomer and polyamide, including, for example, Pebax® thermoplastic polyether block amides, commercially available from Arkema Inc; crosslinked transpolyisoprene blends; conventional polyurethanes and polyureas; polyester-based thermoplastic elastomers, such as Hytrel®, commercially available from E.I. du Pont de Nemours and Company; polyurethane-based thermoplastic elastomers, such as Elastollan®, commercially available from BASF; polyphenylene oxide resins, such as Noryl®, commercially available from GE Plastics; synthetic and natural vulcanized rubber; ionomeric resins; acid copolymers which do not become part of an ionomeric copolymer; and combinations thereof. Commercially available ionomeric cover materials suitable for use herein include, but are not limited to, Surlyn® ionomer resins and DuPont® HPF 1000 and HPF 2000, commercially available from E.I. du Pont de Nemours and Company; and Iotek® ionomers, commercially available from ExxonMobil Chemical Company. Also suitable are blends of ionomers with thermoplastic elastomers. Suitable ionomeric cover materials are further disclosed, for example, in U.S. Pat. Nos. 6,653,382, 6,756,436, 6,894,098, 6,919,393, and 6,953,820, the entire disclosures of which are hereby incorporated herein by reference. Suitable cover materials and constructions also include, but are not limited to, those disclosed in U.S. Pat. Nos. 6,117,025, 6,767,940, and 6,960,630, the entire disclosures of which are hereby incorporated herein by reference.

Golf ball cover compositions optionally contain one or more filler(s) and/or additive(s). Suitable fillers include, for example, metal oxides, barium sulfate, zinc sulfate, calcium carbonate, zinc carbonate, barium carbonate, mica, talc, clay, silica, lead silicate, and the like. Suitable additives include, for example, coloring agents, fluorescent agents, whitening agents, metals, antioxidants, dispersants, UV absorbers, light stabilizers, plasticizers, surfactants, viscosity modifiers, compatibility agents, foaming agents, reinforcing agents, release agents, and the like.

Golf ball cores of the present invention may consist of a single, unitary layer, comprising the entire core from the center of the core to its outer periphery, or they may consist of a center surrounded by at least one outer core layer. The center, innermost portion of the core is preferably solid, but may be semi-solid, hollow, fluid-, powder-, or gas-filled. The term "semi-solid" as used herein refers to a paste, a gel, or the like. The outer core layer may be solid, or it may be a wound layer formed of a tensioned elastomeric material. Golf ball cores of the present invention generally have an overall diameter of from 1.00 inches to 1.63 inches and a compression of 100 or less, preferably 80 or less, and more preferably 75 or less.

Any core material known to one of ordinary skill in the art is suitable for use in golf ball cores of the present invention. Suitable core materials include, for example, natural and synthetic rubbers, such as polybutadiene, polyisoprene, ethylene propylene rubber, ethylene propylene diene rubber, styrene-butadiene rubber, styrenic block copolymer rubbers (such as SI, SIS, SB, SBS, SIBS, and the like, where "S" is styrene, "I" is isobutylene, and "B" is butadiene), butyl rubber, halobutyl rubber, copolymers of isobutylene and para-alkylstyrene, halogenated copolymers of isobutylene and para-alkylstyrene, copolymers of butadiene with acrylonitrile, polychloroprene, alkyl acrylate rubber, chlorinated isoprene rubber, and acrylonitrile chlorinated isoprene rubber; thermoplastics, such as ionomer resins, polyamides, and polyesters; and thermoplastic and thermoset polyurethanes and polyureas.

In a preferred embodiment, the core is formed from a rubber composition comprising a rubber, a crosslinking agent, a filler, a co-crosslinking agent or free radical initiator, and optionally a cis-to-trans catalyst. Suitable rubbers include natural and synthetic rubbers; polybutadiene and styrene-butadiene are preferred. The crosslinking agent typically includes a metal salt, such as a zinc salt or magnesium salt, of an acid having from 3 to 8 carbon atoms, such as (meth) acrylic acid. The free radical initiator can be any known polymerization initiator which decomposes during the cure cycle, including, but not limited to, dicumyl peroxide, 1,1-di-(t-butylperoxy) 3,3,5-trimethyl cyclohexane, a-a bis-(t-butylperoxy) diisopropylbenzene, 2,5-dimethyl-2,5 di-(t-butylperoxy) hexane or di-t-butyl peroxide, and mixtures thereof. Suitable types and amounts of rubber, crosslinking agent, filler, co-crosslinking agent, and initiator are more fully described in, for example, U.S. Patent Application Publication Nos. 2003/0119989 and 2003/0144087, the entire disclosures of which are hereby incorporated herein by reference. Reference is also made to U.S. Patent Application Publication No. 2003/0144087 for various ball constructions and materials that can be used in golf ball core, intermediate, and cover layers.

Golf balls of the present invention optionally include one or more intermediate layers disposed between the core and the cover. When present, the overall thickness of the intermediate layer(s) is generally within the range having a lower limit of 0.01 inches or 0.05 inches or 0.1 inches and an upper limit of 0.3 inches or 0.35 inches or 0.4 inches.

One or more of the optional intermediate layers may be formed from a saturated polyurethane composition of the present invention. Also suitable as intermediate layer materials are the cover layer materials given above. In a particular embodiment, the intermediate layer is formed from a composition comprising an ionomeric material, particularly an ionic copolymer of ethylene and an unsaturated monocarboxylic acid, such as Surlyn® ionomers, commercially available from E.I. du Pont de Nemours and Company. The acid copolymer is optionally an E/X/Y-type terpolymer wherein E is ethylene, X is a $C_3$ to $C_8$ α,β-ethylenically unsaturated mono- or dicarboxylic acid, and Y is a softening monomer. The acid copolymer may be partially or fully neutralized with a metal salt, wherein the metal is preferably selected from barium, lithium, sodium, zinc, bismuth, chromium, cobalt, copper, potassium, strontium, titanium, tungsten, magnesium, manganese, cesium, iron, nickel, silver, aluminum, tin and calcium, and wherein the metal salt is a salt of a fatty acid, particularly stearic, bebenic, erucic, oleic, linoleic, and dimerized derivatives thereof. The ionomeric material is optionally blended with a thermoplastic component, such as a copolyetherester, copolyesterester, copolyetheramide, elastomeric polyolefin, styrene-diene block copolymer or hydrogenated derivative thereof, copolyesteramide, thermoplastic polyurethane, polyurea, grafted metallocene catalyzed polymer, or polyimide. Suitable ionomeric materials, and blends thereof, are further disclosed, for example, in U.S. Pat. No. 6,953,820 and U.S. Patent Application Publication Nos. 2001/0018375, 2001/0019971, and 2005/0049367, the entire disclosures of which are hereby incorporated herein by reference. In another particular embodiment, the intermediate layer is formed from a composition comprising a primarily or fully non-ionomeric thermoplastic material. Suitable non-ionomeric materials include, for example, polyamides and polyamide blends, grafted and non-grafted metallocene catalyzed polyolefins and polyamides, polyamide/ionomer blends, polyamide/non-ionomer blends, polyphenylene ether/ionomer blends, and combinations thereof. Examples of grafted and non-grafted metallocene catalyzed polyolefins and polyamides, polyamide/ionomer blends, and polyamide/non-ionomer blends are more fully disclosed in U.S. Pat. No. 6,800,690, the entire disclosure of which is hereby incorporated herein by reference. The intermediate layer may also be formed from the compositions as disclosed in U.S. Pat. No. 5,688,191, the entire disclosure of which is hereby incorporated herein by reference. Suitable intermediate layer materials are further disclosed, for example, in U.S. Pat. No. 6,835,794, the entire disclosure of which is hereby incorporated herein by reference.

Golf balls of the present invention preferably have an overall diameter within the range having a lower limit of 1.6 or 1.62 or 1.66 inches and an upper limit of 1.69 or 1.74 or 1.800 inches. More preferably, golf balls of the present invention have an overall diameter of 1.68 inches. Golf balls of the present invention preferably have a compression of 120 or less, or 110 or less, or 105 or less. Golf balls of the present invention preferably have a COR at 125 ft/s of 0.750 or greater, or 0.780 or greater, or 0.790 or greater, or 0.800 or greater.

Suitable golf ball constructions and materials are further disclosed, for example, in U.S. Patent Application Publication Nos. 2005/0164810, and 2005/0255941; U.S. Pat. Nos. 5,919,100, and 7,004,856; and PCT Publications WO00/23519 and WO00/29129. The entire disclosure of each of these references is hereby incorporated herein by reference.

In a particular embodiment, the present invention provides a one-piece golf ball formed from composition comprising a saturated polyurethane, wherein the polyurethane is the product of a reaction between an $H_{12}$MDI/PTMEG-based prepolymer and a polycaprolactone curing agent.

In another particular embodiment, the present invention provides a two-piece golf ball wherein at least one layer is formed from a saturated polyurethane composition, wherein the polyurethane is the product of a reaction between an $H_{12}$MDI/PTMEG-based prepolymer and a polycaprolactone curing agent. Preferably, the cover is formed from the saturated polyurethane composition.

In another particular embodiment, the present invention provides a multi-layer golf ball wherein at least one layer is formed from a saturated polyurethane composition, wherein the polyurethane is the product of a reaction between an $H_{12}$MDI/PTMEG-based prepolymer and a polycaprolactone curing agent. A core layer, a cover layer, an intermediate layer, or any combination thereof may be formed from the saturated polyurethane composition. Preferably, a cover layer is formed from the saturated polyurethane composition.

In yet another particular embodiment, the present invention provides a multi-layer golf ball having a compression molded rubber core, at least one injection or compression molded intermediate layer, and an outer cover layer formed from a saturated polyurethane composition, wherein the polyurethane is the product of a reaction between an $H_{12}$MDI/PTMEG-based prepolymer and a polycaprolactone curing agent. Preferably, the rubber core composition comprises a rubber, a crosslinking agent, a filler, a co-crosslinking agent or free radical initiator, and optionally a cis-to-trans catalyst. The rubber is preferably selected from polybutadiene and styrene-butadiene. The crosslinking agent is a metal salt, preferably a zinc salt or magnesium salt of (meth) acrylic acid. The free radical initiator is preferably selected from dicumyl peroxide, 1,1-di-(t-butylperoxy) 3,3,5-trimethyl cyclohexane, a-a bis-(t-butylperoxy) diisopropylbenzene, 2,5-dimethyl-2,5 di-(t-butylperoxy) hexane or di-t-butyl peroxide, and mixtures thereof. Suitable types and amounts of rubber, crosslinking agent, filler, co-crosslinking agent, and initiator are more fully described in, for example, U.S. Patent Application Publication Nos. 2003/0119989 and 2003/0144087, the entire disclosure of which are hereby incorporated herein by reference.

EXAMPLES

It should be understood that the examples below are for illustrative purposes only. In no manner is the present invention limited to the specific disclosures therein.

Commercially available materials used in the examples below include:

CAPA® 3031, a very low molecular weight TMP-initiated polycaprolactone commercially available from Solvay, Inc.;

HCC-19584, a white dispersion commercially available from PolyOne Corporation;

Vestanat® T 6040, a blend of isophorone diisocyanate and isocyanurate trimer of isophorone diisocyanate, commercially available from Degussa Corporation; and Oxyester T 1136, a polyester polyol manufactured by Degussa Corporation.

An invention polyurethane was prepared by combining an $H_{12}MDI/PTMEG$ based prepolymer having an isocyanate content of 15% and a curative. The curative was a blend of CAPA® 3031 and HCC-19584.

A comparative polyurethane was similarly prepared with Vestanat® T 6040 as the prepolymer and a curative blend of CAPA® 3031, Oxyester T 1136, and HCC-19584.

The relative amount of each component used to produce the polyurethanes is reported in Table 1 below.

TABLE 1

| Formulation | Invention Polyurethane | Comparative Polyurethane |
| --- | --- | --- |
| prepolymer | 1 equivalent $H_{12}MDI/PTMEG$ compound | 1 equivalent Vestanat ® T 6040 |
| curative | 0.95 equivalent CAPA ® 3031 3.5% HCC-19584 white dispersion | 0.80 equivalent CAPA ® 3031 3.5% HCC-19584 white dispersion 0.15 equivalent Oxyester T 1136 |

The material hardness of the invention polyurethane, comparative polyurethane, and the cover material used in ProV1® golf balls, commercially available from Acushnet Company, were measured and the results are reported in Table 2 below.

The invention polyurethane and the comparative polyurethane compositions were each cast over a 1.62 inch diameter cased core to produce multi-layer golf balls having an overall diameter of 1.68 inches. Each cased core was a golf ball subassembly including a 1.550 inch diameter solid polybutadiene core surrounded by an 0.035 inch thick Surlyn® ionomer layer.

The resulting golf balls were evaluated for cover hardness, ball compression and COR, impact durability, cold crack resistance, moisture and sunlight resistance (QUV testing), shear rating, and spin. The results are reported in Table 2. Also evaluated and reported in Table 2 for comparative purposes are ProV1® golf balls, commercially available from Acushnet Company.

TABLE 2

| Cover Layer Material | Invention Polyurethane | Comparative Polyurethane | ProV1 ® |
| --- | --- | --- | --- |
| Material Hardness (Shore D) | 61 | 62 | 48 |
| Cover Hardness (Shore D)/(Shore C) | 66/96 | 71/95 | 59/83 |
| Compression | 96 | 90 | 91 |
| COR @ 125 ft/sec | 0.805 | 0.804 | 0.806 |
| Impact Durability @ 400 hits | 1 failure @ 265 1 failure @ 287 1 failure @ 290 1 failure @ 298 1 failure @ 368 1 failure @ 375 1 failure @ 390 | 1 failure @ 84 1 failure @ 100 3 failures @ 108 1 failure @ 133 | no failures |
| Cold Crack Resistance @ 5° F. | no failures | no failures | no failures |
| QUV after 8 days ΔYI, Δb* | 1.42, −5.51 | 0.8, 0.4 | 81.0, 21.14 |
| Molded Ball Shear Rating | 0 | 1 | 1 |
| Painted Ball Shear Rating | 1 | 1 | 2 |
| Spin Data Standard Driver | | | |
| Launch | 9.3 | * | 9.2 |
| Spin | 2973 | * | 3129 |
| Speed | 162.2 | * | 161.1 |
| Half Wedge | | | |
| Launch | 33.8 | * | 31.0 |
| Spin | 5695 | * | 6957 |
| Speed | 52.5 | * | 53.4 |

*not measured

Material hardness is determined according to ASTM D2240 and involves measuring the hardness of a flat "slab" or "button" formed of the material.

Cover hardness is determined according to ASTM D2240 by placing the probe on a flat surface of the golf ball.

Compression is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low stiffness cores will not cause the spring to deflect by more than 1.25 mm and therefore have a zero Atti compression measurement. The Atti compression tester is designed to measure objects having a diameter of 42.7 mm (1.68 inches); thus, smaller objects, such as golf ball cores, must be shimmed to a total height of 42.7 mm to obtain an accurate reading.

COR is determined according to a known procedure wherein a golf ball or golf ball subassembly (e.g., a golf ball core) is fired from an air cannon at a given velocity (125 ft/s for purposes of the present invention). Ballistic light screens are located between the air cannon and the steel plate to measure ball velocity. As the ball travels toward the steel plate, it activates each light screen, and the time at each light screen is measured. This provides an incoming transit time period proportional to the ball's incoming velocity. The ball impacts the steel plate and rebounds though the light screens, which again measure the time period required to transit between the light screens. This provides an outgoing transit time period proportional to the ball's outgoing velocity. COR is then calculated as the ratio of the outgoing transit time period to the incoming transit time period, $COR=T_{out}/T_{in}$.

Impact durability is determined using a hitting machine to hit a golf ball into a catching net, then automatically returning the ball into position where it is hit again. The test continues until the pre-set number of hits is reached, 400 hits being the maximum number of hits used herein, or until the golf ball fails, as judged by visual observations. A minimum sample size of 6 golf balls is used, each subjected to the pre-set number of hits. The golf balls are hit at room temperature, i.e., approximately 22° C.

Cold crack resistance is measured according to the following procedure. Finished golf balls are stored at 5° F. for at least 24 hours and then subjected to 15 blows in a coefficient machine at 125 ft/sec. The balls are allowed to return to room temperature and then visually inspected for cover cracking.

QUV is an accelerated weathering test simulating outdoor exposure to moisture and sunlight. To determine QUV, finished golf balls are placed in custom made golf ball holders and inserted into a sample rack of a Q-PANEL model QUV/SER Accelerated Weathering Tester manufactured by Q-Panel Lab Products. The sample holders were constructed such that each ball was approximately 1.75 inches from a UVA-340 bulb, at its closest point. The weathering tester was then cycled every 4 hours between the following two sets of conditions: Condition #1—water bath temperature=50° C., UV lamps on, set and controlled at an irradiance power of 1.00 W/m$^2$/nm; Condition #2—water bath temperature=40° C., UV lamps turned off. The covers are then tested for changes in yellow index ($\Delta$YI) according to ASTM G53-88 (now replaced with ASTM G154-00), and changes in perceptual yellowness ($\Delta$b*) according to CIELAB.

Shear rating is determined according to a procedure in which each ball is hit three times by a live golfer using a 58° Vokey wedge. The resulting damage to the ball is rated by comparing the ball to a set of standard balls having damage ratings of from 0 (no visible damage to the cover or paint) to 6 (excessive cover shear, heavy material removal). For purposes of the present invention, shear ratings of 2 and below are considered acceptable.

Spin data is measured by striking the golf ball with a standard driver or half wedge using a True Temper Test Machine.

When numerical lower limits and numerical upper limits are set forth herein, it is contemplated that any combination of these values may be used.

All patents, publications, test procedures, and other references cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those of ordinary skill in the art without departing from the spirit and scope of the invention. Accordingly, it is not intended that the scope of the claims appended hereto be limited to the examples and descriptions set forth herein, but rather that the claims be construed as encompassing all of the features of patentable novelty which reside in the present invention, including all features which would be treated as equivalents thereof by those of ordinary skill in the art to which the invention pertains.

What is claimed is:

1. A golf ball comprising a core layer and a cover layer, wherein the cover layer is formed from a saturated polyurethane composition having a material hardness of at least 50 Shore D, wherein the polyurethane is the product of a reaction between a prepolymer and a polycaprolactone curing agent, the prepolymer consisting essentially of a polyol component and a diisocyanate component, wherein the polyol component consists of polytetramethylene ether glycol and the diisocyanate component consists of bis(4-isocyanatocyclohexyl) methane; wherein the curing agent consists of polycaprolactone and a white dispersion; and wherein the prepolymer and the curing agent are present in a ratio of from 0.5:1 to 16:1.

2. The golf ball of claim 1, wherein the polycaprolactone curing agent is selected from trimethylol propane-initiated polycaprolactone, diethylene glycol-initiated polycaprolactone, and polycarbonate-initiated polycaprolactone.

3. The golf ball of claim 1, wherein the polycaprolactone curing agent is trimethylol propane-initiated polycaprolactone.

4. A golf ball comprising a core layer and a cover layer, wherein the cover layer is formed from a saturated polyurethane composition exhibiting no failures at 250 hits in an impact durability test and having a material hardness of at least 55 Shore D, wherein the polyurethane is the product of a reaction between a prepolymer and a polycaprolactone curing agent, the prepolymer consisting essentially of a polyol component and a diisocyanate component, wherein the polyol component consists of polytetramethylene ether glycol and the diisocyanate component consists of bis(4-isocyanatocyclohexyl) methane; wherein the curing agent consists of polycaprolactone and a white dispersion; and wherein the prepolymer and the curing agent are present in a ratio of from 0.5:1 to 16:1.

5. The golf ball of claim 4, wherein the polycaprolactone curing agent is selected from trimethylol propane-initiated polycaprolactone, diethylene glycol-initiated polycaprolactone, and polycarbonate-initiated polycaprolactone.

6. The golf ball of claim 4, wherein the polycaprolactone curing agent is trimethylol propane-initiated polycaprolactone.

* * * * *